H. PETERSEN.
BELT FASTENER.
APPLICATION FILED MAY 6, 1915.
1,224,498.
Patented May 1, 1917.
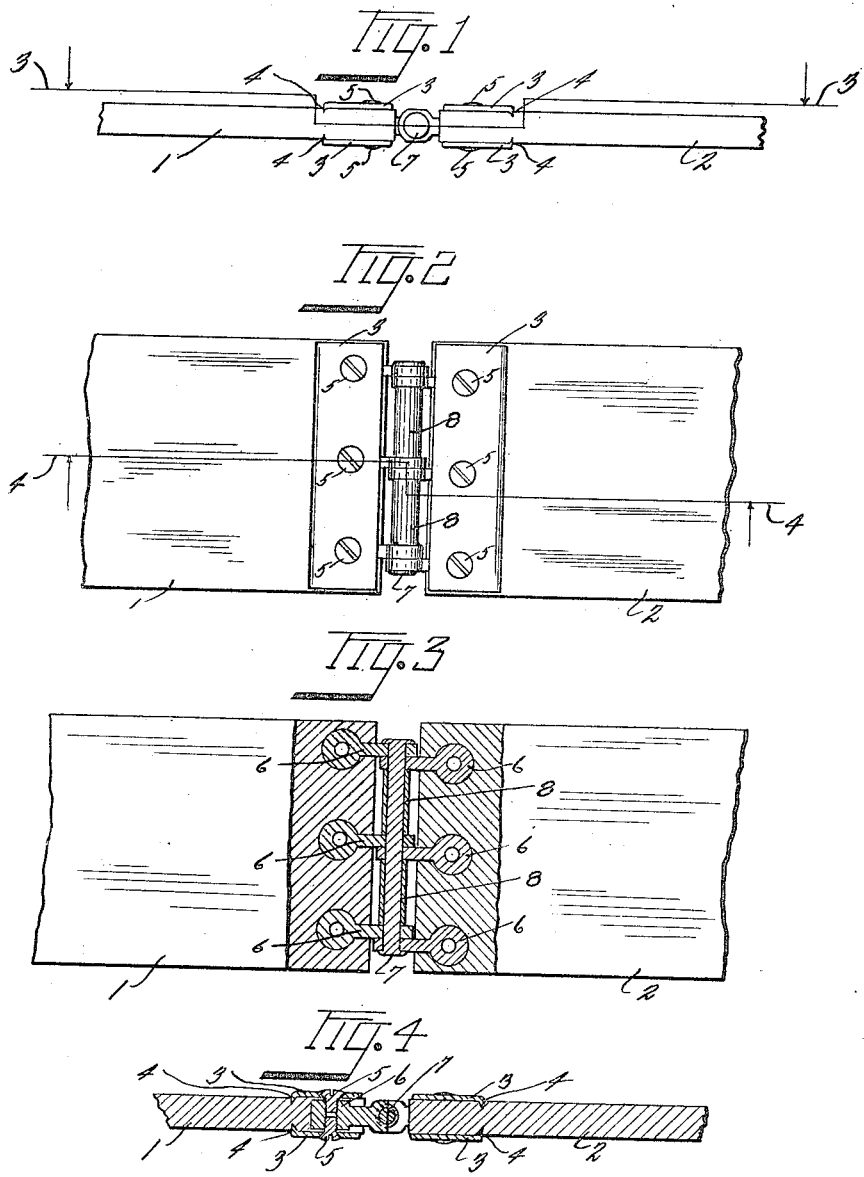
WITNESSES
Paul A. Niesen
Otto Melchior
INVENTOR
Hans Petersen
H. J. Danders
BY
ATTY.

UNITED STATES PATENT OFFICE.

HANS PETERSEN, OF LOSTWOOD, NORTH DAKOTA.

BELT-FASTENER.

1,224,498.  Specification of Letters Patent.  Patented May 1, 1917.

Application filed May 6, 1915. Serial No. 26,229.

*To all whom it may concern:*

Be it known that I, HANS PETERSEN, a citizen of the United States, residing at Lostwood, in the county of Mountrail and State of North Dakota, have invented certain new and useful Improvements in Belt-Fasteners, of which the following is a specification.

This invention relates to improvements in belt fasteners and its object is to provide a simple and efficient means whereby the ends of the leather or belt sections may be united in a manner to make the belt of a continuous form. With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of two belt ends connected by my improved belt fastener.

Fig. 2 is a top plan view of the same.

Fig. 3 is a plan view, partly in section, taken on line 3—3 of Fig. 1.

Fig. 4 is a longitudinal sectional view taken on line 4—4 of Fig. 2.

Like reference characters indicate corresponding parts throughout the several views.

The reference numerals 1 and 2 designate the ends of belts to be connected and each belt end is provided with the cover plates 3 which are formed with pronged terminations 4 adapted to obtain a purchase upon the belt and said cover plates are connected to the belt ends by means of the adjusting screws 5 which extend into threaded eyes of the couplings or links 6 which links are formed with eyes at their opposite ends also adapted to receive the transversely extending locking pin 7. The couplings 6 are so arranged that the eye of any one that is projected from one belt end to engage the pin 7 is disposed beside the eye of another coupling projected from the opposite belt end to engage said pin 7 and the pairs of abutting couplings thus formed are spaced away from each other by the sleeve sections 8, 8 arranged upon the pin 7. This arrangement prevents a lateral strain upon the belt ends by the projected portions of the couplings 6. The belt ends are cut out in the plane of the couplings 6 to permit the insertion of said couplings.

What is claimed is:—

A belt-fastener, including pairs of plates, a pair being applied to each section of the belt, means for connecting said pairs of plates together, couplings having eyes at their ends, said plate-connecting means comprising screws having their heads counter-sunk into, and extending through said plates and threaded into said couplings, the eyes at one end of said couplings receiving said plate-connecting means, a locking pin inserted through the eyes at the other ends of said couplings and lying transversely of the belt, intermediate the opposed ends of said belt-sections, and spacing members sleeved upon said locking-pin, intermediate the locking-pin receiving eyes of said couplings.

In testimony that I claim the foregoing as my own I have hereto affixed my signature in the presence of two subscribing witnesses.

HANS PETERSEN.

Witnesses:
 CARL C. PETERSEN,
 C. E. BURDICK.

Copies of this patent may be obtained for five cents each, by addressing the "Commissioner of Patents, Washington, D. C."